(12) United States Patent
Fox

(10) Patent No.: US 6,276,399 B1
(45) Date of Patent: Aug. 21, 2001

(54) BIBCOCK NOZZLE EXTENSION

(76) Inventor: Christopher K. Fox, 1621 SW. 2nd Ave., Pompano Beach, FL (US) 33060

( * ) Notice: Subject to any disclaimer, the term of this patent is extended or adjusted under 35 U.S.C. 154(b) by 0 days.

(21) Appl. No.: 09/200,279

(22) Filed: Nov. 24, 1998

(51) Int. Cl.[7] ............................................. F16L 11/00
(52) U.S. Cl. ................................................. 138/109; 285/8
(58) Field of Search ................................. 138/109, 110, 138/96 T, 96 R; 239/600, 525, 530; 285/8

(56) References Cited

U.S. PATENT DOCUMENTS

| | | | | |
|---|---|---|---|---|
| 2,185,741 | * | 1/1940 | Sorg et al. | 138/110 X |
| 3,588,148 | * | 6/1971 | Barsumian | 138/109 X |
| 4,005,735 | * | 2/1977 | Miyamoto | 138/96 R |
| 4,830,281 | * | 5/1989 | Calder | 239/119 |
| 5,608,963 | * | 3/1997 | Lefere | 138/109 X |
| 5,722,595 | * | 3/1998 | Parisi | 239/288 |

* cited by examiner

Primary Examiner—Patrick Brinson
(74) Attorney, Agent, or Firm—Malin, Haley & DiMaggio

(57) ABSTRACT

A bibcock nozzle extension for use with an outdoor bibcock is disclosed for facilitating an easy manual connection of a bibcock's threaded nozzle to a hose. A bibcock nozzle extension has a contoured outer surface which conforms to the palm of a human hand and facilitates an easy, manual, leak-proof connection between a bibcock's threaded nozzle and a bibcock nozzle extension. The extra length provided by a bibcock nozzle extension allows a user to easily make a hose connection to a manually difficult bibcock access to provide sufficient space to manipulate the operator's hands when connecting a garden hose to the bibcock extension without touching the wall or the bibcock handle.

7 Claims, 4 Drawing Sheets

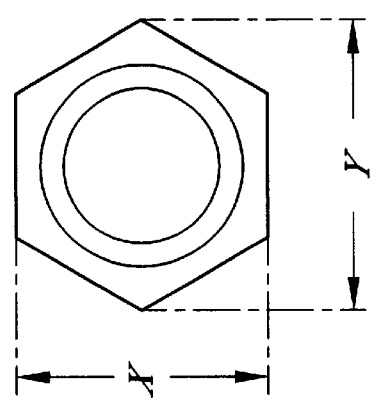
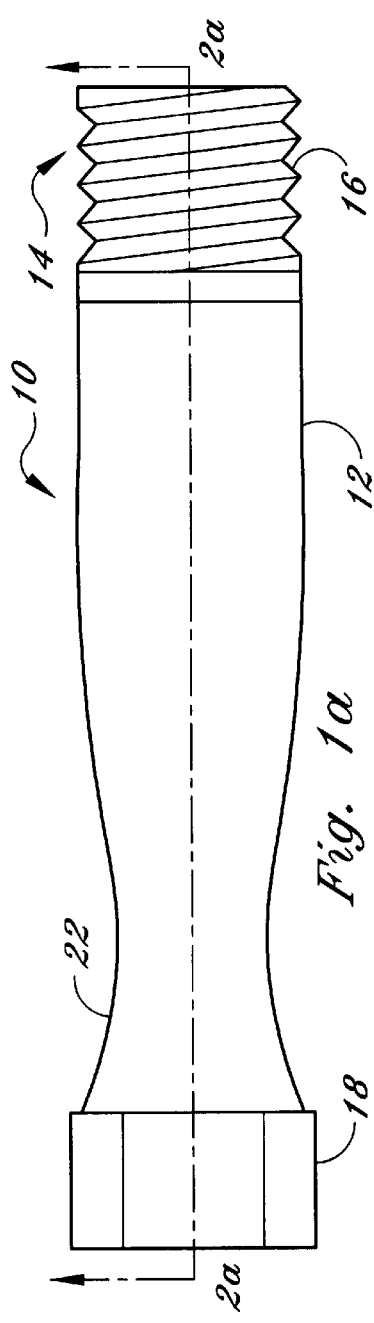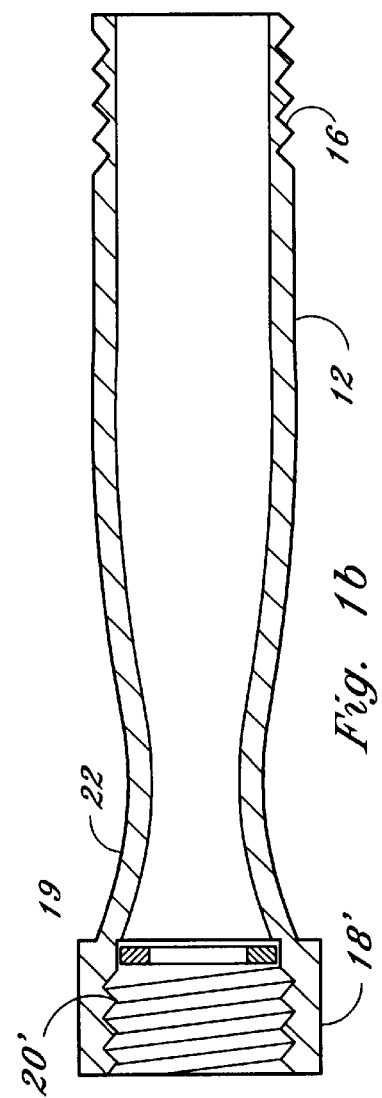

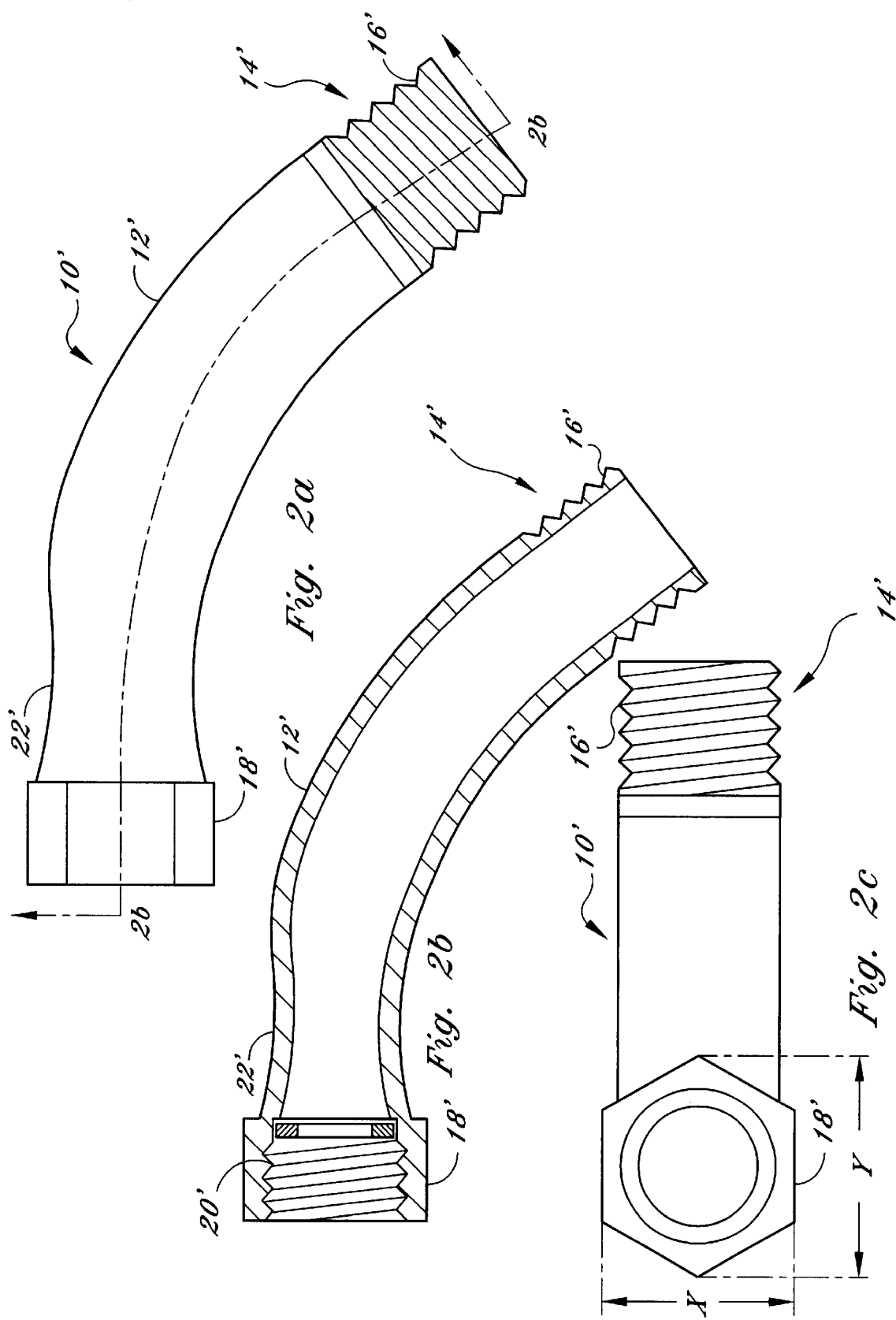

BIBCOCK NOZZLE EXTENSION

BACKGROUND OF THE INVENTION

1. Field of the Invention

The instant invention relates to a fluid delivery pipe extension and more particularly to an outdoor bibcock nozzle extension to provide a manually accessible hose connection to outdoor bibcocks that are difficult to manually access because the bibcock threaded outlet hose connector is too close to a wall or spicket handle.

2. Description of the Prior Art

An outdoor house bibcock typically comprises a valve body with a manually rotated stopcock that terminates in a male threaded nozzle outlet. A bibcock is mounted on an outside dwelling wall and connects to a water pipe passing through the wall. It provides an outdoor source of water using a flexible hose for various outdoor activities such as watering a lawn or washing a car. Manually connecting the female threaded hub end of a flexible hose to the male threaded nozzle end of a bibcock provides a conduit to direct and transport water flow from the bibcock to desired outdoor locations. The male threaded nozzle end of a bibcock enters the female threaded hub end of the hose and the hub end is manually rotated to attach the hose to the bibcock. Sufficient manual space between the exterior wall and the bibcock nozzle outlet is required to easily and comfortably maneuver the operator's hands while making the attachment. It is well known that connecting flexible hosing to an outdoor bibcock can be difficult and inconvenient since a bibcock outlet is often located close to a building wall, or found surrounded by shrubbery and bushes.

A bibcock's size and nozzle location very close to a wall makes it difficult to manually attach a hose without continuously scraping one's hand or knuckles against a building wall or the bibcock handle.

A bibcock terminates in a male threaded nozzle end enabling a connection to the female connector of a conventional garden hose. The liquid flow from the bibcock is dependent on the orientation of the bibcock's male threaded nozzle end which is usually directed directly down or angled outwardly. This invention addresses the problem of nozzle outlet wall space by providing an article of manufacture by which a garden hose can be easily and manually connected to an outdoor bibcock.

U.S. Pat. No. 902,806, issued to Worth, discloses a hose coupling. The hose coupling is tubular in shape and rigid and is used to connect hoses that are adapted to carry compressed air, steam, etc. The Worth invention, with its tubular shape and rigid construction, does not contemplate connecting a bibcock to a flexible hosing.

U.S. Pat. No. 2,108,759, issued to Turman, discloses an improvement for dispensing gasoline and other inflammable liquids by using a synthetic rubber nozzle material which eliminates static electricity. The Turman reference is primarily concerned with the synthetic material used for the body of the nozzle and not with the hard tubular shape of the nozzle.

The prior art does not disclose an apparatus to provide manual access to a bibcock for connecting a water hose; nor does the prior art suggest providing an extension for an accessible, leakproof connection to an otherwise inaccessible bibcock. It is to the effective resolution of these and other problems that the present invention is directed.

SUMMARY OF THE INVENTION

This invention relates to an article of manufacture and method for facilitating an easy and manual connection of a hose to an outdoor bibcock by extending the male threaded nozzle end associated with a bibcock. The invention comprises an elongated, waterproof, tubular body member with one end having external screw threads (male end) and the other end having internal screw threads (female end). The female end of the elongated tubular body member screws onto the threaded male end of the bibcock and is attached by manual rotation of the tubular body member. The male end of the tubular body inserts into the hub section of the hose and is attached by manual rotation of the hose hub. The elongated tubular body member may have a contoured outer surface to facilitate an easy grip by a user's palm for manual rotation of the specified tubular body member. The elongated tubular body member provides a conduit extension to transport water from a bibcock to a garden hose for use in various outdoor locations. An important advantage of the present invention is to add distance from a wall in a downward direction (see FIG. 3a), or an outward direction (see FIG. 3b), thereby increasing the manual accessibility of the bibcock by extending the threaded male connecting end to an accessible location away from exterior building walls.

It is an object of the present invention to provide an outdoor bibcock nozzle extension to enable an easy manual attachment of an outdoor hose by extending the distance of a bibcock nozzle outlet away from a wall such that sufficient space is provided to allow an operator's hands to rotate the garden hose connector when attaching or removing from a bibcock easily and quickly.

It is a further object of the present invention to provide an outdoor bibcock nozzle extension that may be contoured to the palm of a human hand for easy manual rotation to obtain a leak-proof bibcock connection and tapered for increased strength.

In accordance with these and other objects which will become apparent hereinafter, the instant invention will now be described with particular reference to the accompanying drawings.

BRIEF DESCRIPTION OF THE DRAWINGS

FIG. 1a shows a side elevational view of a bibcock nozzle extension in accordance with the present invention;

FIG. 1b shows a side elevational view in cross section of the bibcock nozzle extension shown in FIG. 1a;

FIG. 1c shows a female end view in elevation of the bibcock nozzle extension shown in FIG. 1a.

FIG. 2a is a side elevational view of an alternate embodiment of the present invention;

FIG. 2b is a cross sectional elevational view of an alternate embodiment of the present invention;

FIG. 2c is an elevational view of the female end of an alternate embodiment of the invention shown in FIG. 2a;

FIG. 5b is an end elevational view of the female end of the device shown in FIG. 5a.

DESCRIPTION OF THE PREFERRED EMBODIMENTS

Figure 4B:
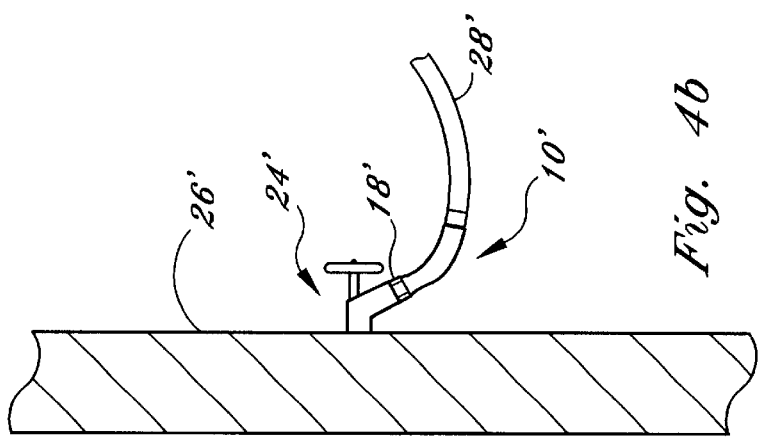
FIG. 4b is a side elevational view showing an alternate embodiment of a bibcock nozzle extension connected to a bibcock.

Referring now to the drawings, FIG. 1a shows a bibcock nozzle extension of the instant invention, generally designated by the reference numeral 10, and comprised of a rigid plastic elongated tubular body 12 having a first end 14 with external screw threads (male connector) 16 suitable for attachment to a garden hose, and a second end 18 having internal screw threads (female threaded connector) 20 opposite said first end. Tubular body 12 has a contoured outer surface at mid-section 22 which conforms to the palm of a hand, and is preferably molded from hardened plastic or some other suitable waterproof material. Other materials such as metal are considered within the scope of the invention but they are not preferred due to cost and weight considerations.

In this embodiment, the length of the tubular body 12 is approximately 5 inches, but other lengths are within the scope of this invention sufficient to extend a bibcock nozzle outlet away from the exterior wall surface as described below. End 14 is circular in shape and attaches to a female connector existing on the end of a garden hose, as will soon become apparent. In the preferred embodiment, end 18, has a hexagonal shape as best shown in FIG. 1c with a width across flats, referenced as dimension X, and a width across the corners, referenced as dimension Y. In the preferred embodiment, dimension X is 1.25 inches or some other standard suitable width, and dimension Y is 11/16 inches or some other standard suitable width. End 18 receives the threaded male end of the bibcock as illustrated in FIG. 3a, and preferably includes a gasket or washer 19 for forming a water-tight seal.

Figure 3B:
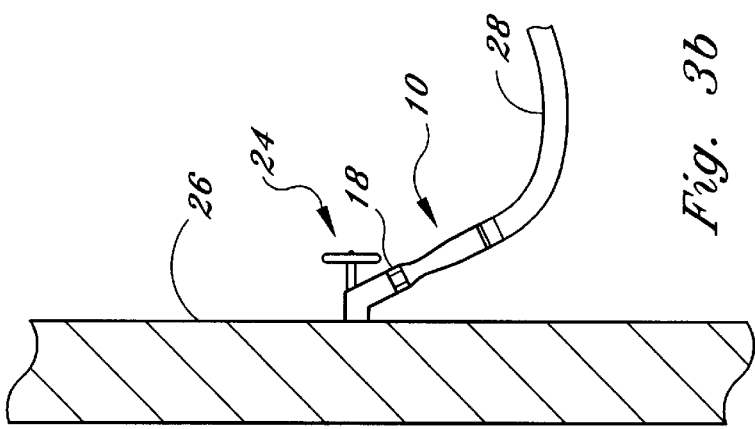
FIG. 3b is a side elevational view showing a bibcock nozzle extension connected to the threaded nozzle of a bibcock.
Figure 3A:
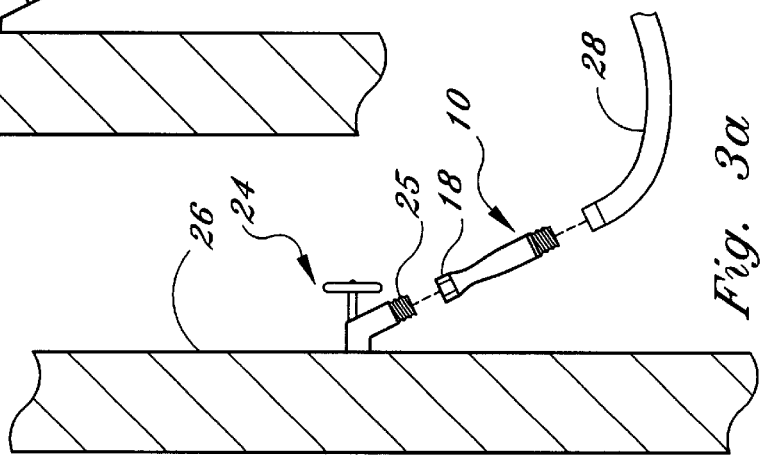
FIG. 3a is an exploded side elevational view showing a bibcock nozzle extension in use with a wall in cross section.

As best shown in FIGS. 3a and 3b, outdoor bibcocks 24 are generally located close to a wall exterior surface 26 and are therefore not easily manually accessible for connecting a hose 28. The bibcock nozzle extension 10 inserts into an outdoor bibcock such that the bibcock's male threaded nozzle end 25 is threadably engaged with bibcock nozzle extension end 18 via internal screw threads 20. The user grips the contoured section 22 of the bibcock nozzle extension 10 and manually turns extension 10 until extension 10 is completely and tightly attached to the bibcock nozzle end 25. The invention provides at least an additional several inches of space from wall 26 to enable sufficient clearance from the wall 26 for the user to easily manually attach a hose 28 to the bibcock's externally threaded end 14. As shown in FIGS. 3a and 3b, the bibcock threaded nozzle extension 10 may be angled outwardly. Attachment of the bibcock nozzle extension provides a threaded connection that is spaced further from wall 26 thereby providing additional clearance for facilitating a manual connection to a hose.

Figure 4A:
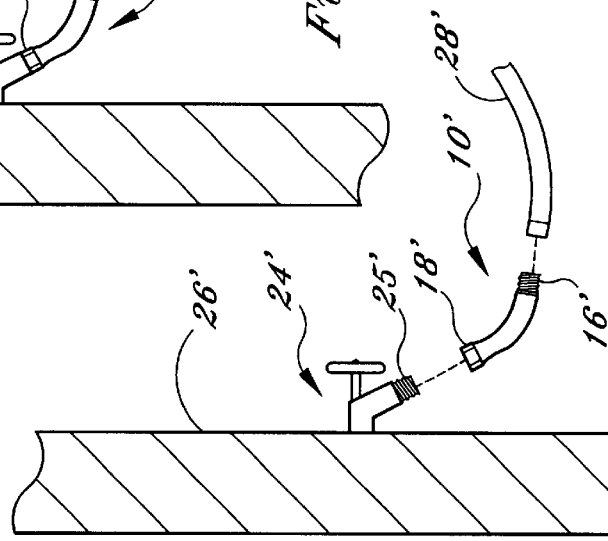
FIG. 4a is an exploded side View showing an alternate embodiment of a bibcock nozzle extension.

In an alternate embodiment, as shown in FIGS. 2a, 2b, and 2c, the bibcock nozzle extension 10 is curved for providing easy accessibility to a bibcock having a downwardly pointed threaded nozzle as shown in FIG. 4a. FIG. 2a shows an alternate embodiment of the instant invention generally designated by the reference numeral 10' comprised of a curved or arcuate, elongated tubular body 12'. The arcuate, tubular body 12' has a contoured outer surface 22' which conforms to the palm of a human hand.

In the alternate embodiment, the axial length of the body member is approximately 5 inches but other lengths are within the scope of the invention to achieve sufficient space from a wall for connection to a garden hose. End 14' is generally circular in shape and includes a threaded male portion 16' for attachment to a garden hose. End 18' has a hexagonal shape as shown in FIG. 2c, and includes an internal threaded female portion 20' for connection to a bibcock.

Hexagonal shaped end 18', has a width across flats, referenced as dimension X, and a width across the corners, referenced as dimension Y. In the preferred embodiment, dimension X is 1.25 inches or some other standard suitable width, and dimension Y is 11/16 inches or some other standard suitable width. A wrench can be used to connect or disconnect hexagonal end 18' to the bibcock nozzle outlet. End 18' receives the threaded male end 25' of a bibcock 24', as illustrated in FIGS. 4a and 4b, and preferably includes a washer or gasket 19' whereby end 20' receives a threaded male end of a bibcock 24' thereby forming a water-tight seal.

As shown in FIGS. 4a and 4b, outdoor bibcocks 24' are generally located close to a wall 26' or to the ground and are therefore not easily accessible for connection to a hose 28'. A bibcock 24', as depicted in FIGS. 3a and 4a, is characterized by a generally downwardly extending nozzle 25'. Accordingly, the bibcock nozzle extension 10' attaches to a bibcock threaded nozzle 25' by engagement of the internal screw threads 20'. The user easily grips the contoured section 22' of the bibcock nozzle extension 10' which enables the user to manually obtain a tight and leakproof connection between the bibcock nozzle extension 10' and the bibcock's threaded nozzle end 25'. The invention provides at least an additional several inches of length to enable sufficient clearance from the wall 26' for the user to easily attach a hose 28' to the bibcock's externally threaded end 14'.

The alternate embodiment is particularly useful for use with outdoor bibcocks 24' that have downward oriented nozzles 25' as shown in FIGS. 4a and 4b.

Figure 5C:
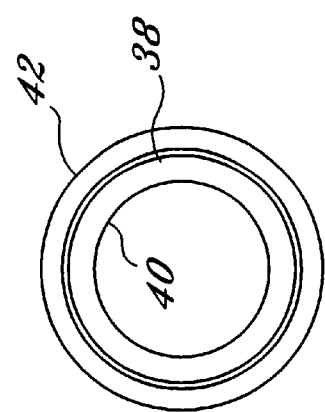
FIG. 5c is an end elevational view of an alternate female end that could be employed in the embodiment shown in FIG. 5a replacing the hexagonal end surface with a circular end surface.
Figure 5A:
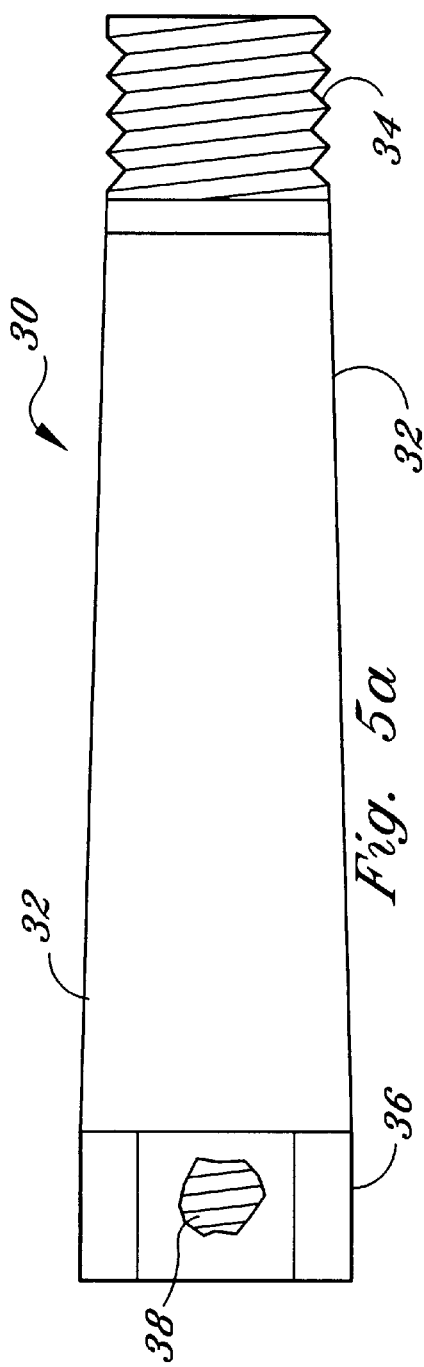
FIG. 5a is a side elevational view partially cut away of yet another alternate embodiment of the invention.
Figure 5B:
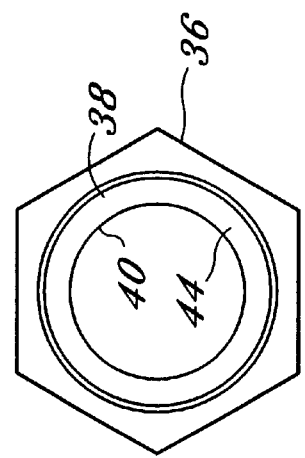

Referring now to FIGS. 5a and 5b, the preferred embodiment of the bibcock extension is shown comprised of a tubular tapered body 32 that is conically shaped for strength having a male threaded end portion 34 that connects to the female end of a garden hose and a hexagonally shaped end 36 that includes a plurality of threads 38 forming a female connector end that connects to the threaded nozzle outlet of the bibcock. The extension 30 also includes an internal cylindrical passage 40 traversing throughout that allows for the flow of water through the extension 30, which is waterproof, and which is made of a rigid plastic or other suitable material. By having a conically truncated exterior surface, it is believed that the overall strength of the elongated body 32 is improved.

FIG. 5b shows the female end 36 having the hexagonal shape and the internal passage 40, and the internal threaded area 38.

The alternate embodiment shown in the FIG. 5c includes a female end 42 that is circular instead of being hexagonally shaped on the exterior end surface.

Inside the threaded portion 38 is a washer-retaining wall 44 against which a washer may be placed. The added longitudinal strength from being tapered can be utilized when pulling on the hose after the extension has been attached to prevent it from breaking the hexagonal design or bending the extension.

The instant invention has been shown and described herein in what is considered to be the most practical and preferred embodiment and alternate embodiment. It is recognized, however, that departures may be made there-from within the scope of the invention and that obvious modifications will occur to a person skilled in the art.

What is claimed is:

1. An article of manufacture for facilitating the manual connection of an outdoor wall-mounted bibcock to a hose, said bibcock having an externally threaded nozzle outlet mounted close to said wall, said article of manufacture comprising:

an elongated, rigid, waterproof, tubular body member formed about a longitudinal axis, having a longitudinal length of at least 5 inches, said tubular body member having an internally threaded end sized for threaded engagement with said bibcock threaded nozzle, an externally threaded end opposite said internally threaded end, and an outer surface characterized by a contoured mid-section, said outer surface contoured mid section portion including a portion with a first predetermined outside diameter near the end of said tubular body, a second portion adjacent said first portion having a smaller diameter than said first portion and a third portion adjacent said second portion, having a diameter approximately of said first portion providing a curved sunken exterior portion that is contoured and shaped for grasping by the palm of the user's hand disposed between said ends, said body member having an inner surface defining an aperture extending there through, said body member being sized in length at least five inches to provide displacement of the bibcock threaded nozzle from the wall sufficient to allow manual connection or disconnection of the end of a hose to said bibcock nozzle without the hands touching the wall.

2. An article of manufacture according to claim 1, wherein said internally threaded end includes a washer.

3. An article of manufacture according to claim 1, wherein said internally threaded end has a hexagonal outer surface.

4. An article of manufacture according to claim 1, wherein said externally threaded end has a circular shape.

5. An article of manufacture according to claim 1, wherein said exterior body member is tapered in the direction of the longitudinal axis.

6. An article of manufacture of claim 1, wherein said longitudinal axis is linear.

7. An article of manufacture of claim 1, wherein said body is tapered on its exterior for strength.

* * * * *